United States Patent
Smith

(10) Patent No.: US 7,316,303 B2
(45) Date of Patent: Jan. 8, 2008

(54) FORCE-CONTROLLING MECHANICAL DEVICE

(75) Inventor: Malcolm Clive Smith, Cambridge (GB)

(73) Assignee: Cambridge University Technical Services, Ltd., Cambridge (GB)

( * ) Notice: Subject to any disclaimer, the term of this patent is extended or adjusted under 35 U.S.C. 154(b) by 0 days.

(21) Appl. No.: 10/481,419

(22) PCT Filed: Jul. 3, 2002

(86) PCT No.: PCT/GB02/03056

§ 371 (c)(1),
(2), (4) Date: May 14, 2004

(87) PCT Pub. No.: WO03/005142

PCT Pub. Date: Jan. 16, 2003

(65) Prior Publication Data

US 2005/0034943 A1     Feb. 17, 2005

(30) Foreign Application Priority Data

Jul. 4, 2001    (GB) ................................ 0116424.3

(51) Int. Cl.
F16D 57/06    (2006.01)
(52) U.S. Cl. ..................... 188/292; 188/305; 188/312
(58) Field of Classification Search ............ 188/312 X, 188/305 X, 290, 292, 293, 301
See application file for complete search history.

(56) References Cited

U.S. PATENT DOCUMENTS

| | | | |
|---|---|---|---|
| 4,241,814 A | * | 12/1980 | Masclet ...................... 188/266 |
| 4,525,126 A | * | 6/1985 | Laumont ..................... 417/310 |
| 4,898,257 A | * | 2/1990 | Brandstadter ............... 188/305 |
| 5,396,973 A | * | 3/1995 | Schwemmer et al. ..... 188/267.1 |
| 6,253,888 B1 | | 7/2001 | Bell et al. |
| 6,352,143 B1 | | 3/2002 | Niaura et al. |
| 6,412,616 B1 | | 7/2002 | Allen et al. |

FOREIGN PATENT DOCUMENTS

| | | | |
|---|---|---|---|
| DE | 2919899 A | * | 11/1980 |
| DE | 197 27 401 A1 | | 7/1999 |
| EP | 427046 A1 | * | 5/1991 |
| EP | 0 542 573 A2 | | 5/1993 |
| FR | 2 660 386 | | 4/1991 |
| JP | 06143969 A | * | 5/1994 |

OTHER PUBLICATIONS

Translated abstract of DE 19727401 (the original document having been provided by applicant), dated Jan. 7, 1999.*

* cited by examiner

*Primary Examiner*—Pam Rodriguez
(74) *Attorney, Agent, or Firm*—Edell, Shapiro & Finnan, LLC

(57) ABSTRACT

A mechanical device for use in the control of mechanical forces. The device comprising first and second terminals which, in use, are connected to components in a system for controlling mechanical forces. These terminals are moveable with respect to one another. The device further comprises means connected between the terminals to control the mechanical forces at the terminals. These mechanical forces are proportional to the relative acceleration between the terminals, wherein the proportionality term is either a fixed constant or a variable function.

24 Claims, 10 Drawing Sheets

1A

1B

FORCE-CONTROLLING MECHANICAL DEVICE

This invention relates to a device for use in the control of mechanical forces such as vibrational forces.

An example of use of such a device is in vehicle suspension systems. Such systems typically employ passive damping systems, such as a spring in parallel with a damper. Such systems provide only limited possibilities to optimise the various performance requirements of suspension systems, in contrast to active systems. Active suspension systems have expense and complexity associated with them, however, as well as reliability issues. As an alternative, a variety of semi-active suspension systems have been employed, e.g. semi-active dampers. Another approach is to develop more sophisticated passive suspension systems, but these currently do not exploit the full range of possibilities due to being restricted to the use of springs, dampers, levers etc in various combinations. A greater range of possibilities would exist if inertial forces provided by mass elements could be exploited within suspension systems or suspension struts, but this appears impractical if large masses are required. It is the purpose of the present invention to provide a means to build suspension systems with any desired mechanical impedance which is physically realisable in a mechanical network consisting of springs, dampers, levers and masses, but with the important condition that the overall mass of the suspension system can be kept small.

When designing mechanical damping systems a standard analogy between mechanical and electrical networks is often used in which force (respectively velocity) corresponds to current (respectively voltage) and a fixed point in an inertial frame of reference corresponds to electrical ground. This means that well known electrical circuitry design principles can be employed to design passive mechanical systems in some cases. In this analogy, the spring corresponds to the inductor and a damper to a resistor. The correspondence works well in the case of the spring and damper, but there is a restriction in the case of mass and its equivalence to a capacitor. This restriction is due to the fact that the force-velocity relationship satisfied by the mass, namely Newton's Second Law, relates the acceleration of the mass relative to a fixed point in the inertial frame. Effectively this means that one "terminal" of the mass is the ground and the other "terminal" is the position of the centre of mass itself. This is standard in textbooks on electrical-mechanical analogies (see e.g. J. L. Shearer, A. T. Murphy and H. H. Richardson, "Introduction to System Dynamics", Addison-Wesley, 1967, page 111). Clearly, in the electrical context it is not required that one terminal of the capacitor is grounded in all circuit designs. This means that an electrical circuit may not have a direct spring-mass-damper mechanical analogue.

A further drawback with the mass element as the analogue of the capacitor is in the context of synthesis of mechanical impedances. It may be important to assume that the device representing the impedance has negligible mass when compared to other masses in the system. This clearly presents a problem if large masses are required in a given mechanical network to achieve suitable results.

The above difficulties have prevented well known electrical circuit synthesis design principles from being extensively exploited for the synthesis of mechanical networks. These difficulties may be overcome if a mechanical circuit element could be introduced which is a genuine two-terminal device, equivalent to the electrical capacitor. This device should be capable of having small or negligible mass compared to other elements in the system and sufficient linear travel as is commonly assumed for springs and dampers.

According to the present invention there is provided a mechanical device for use in the control of mechanical forces, the device comprising:

first and second terminals for connection, in use, to components in a system for controlling mechanical forces and moveable with respect to one another; and means connected between the terminals to control the mechanical forces at the terminals such that they are proportional to the relative acceleration between the terminals, the proportionality term being either a fixed constant or a variable function.

The variable function may be a function of the relative velocity between the terminals.

The device may be configured such that the mass of the device is independent of the value of the proportionality constant or function.

Means may be provided to restrict the extent of relative movement of the two terminals and the extent of this movement may be specified independently of the predetermined proportionality term.

The device is preferably configured to provide the predetermined proportionality term regardless of its orientation and it may be configured such that no part of the device is connected to a fixed point. The means for providing the predetermined proportionality may comprise a plunger attached to one of the terminals, a housing attached to the other terminal and slidably attached to the plunger, and a flywheel within the housing arranged to be driven when the plunger moves with respect to the housing. The driving mechanism for this flywheel may comprise a means to convert the linear motion of the plunger, sliding relative to the housing, into a rotary motion within the device, such as a rack and pinion configuration, which drives the flywheel through a gearing system.

The means for providing the predetermined proportionality may also comprise hydraulic components, such as a piston and cylinder and means to convert a linear flow of hydraulic fluid into rotary motion, such as a gear pump, which may directly drive a flywheel or be connected thereto by further gearing.

The present invention also provides a mechanical damping system, such as a system within a car suspension, employing a device as defined above.

The invention also provides a method for vibration absorption, employing a device as defined above.

The invention also provides a mass simulator comprising a device according to the above definitions.

In the same way that a spring or a damper has a rotational equivalent, the device of the present invention has embodiments in rotational form. The rotational spring (respectively damper) has terminals which may rotate independently about a common axis and such that the equal and opposite applied torques at the terminals are proportional to the relative angular displacement (velocity) of the two terminals.

According to the present invention there is further provided a mechanical device for use in a system for controlling mechanical torques, the device comprising:

first and second terminals for connection, in use, to components in the system the terminals being independently rotatable; and means connected between the terminals to control the mechanical torque applied thereto such that the torque is proportional to the relative angular acceleration between the terminals, the term of proportionality being either a fixed constant or a variable function.

The device in rotational form may be configured so that the rotational moment of inertia of the device is independent of the proportionality term.

The configuration of the device of the present invention allows the overall dimensions of the unit to be specified independently of the proportionality term.

Examples of the present invention will now be described with reference to the accompanying drawings, in which.

Figure 2:
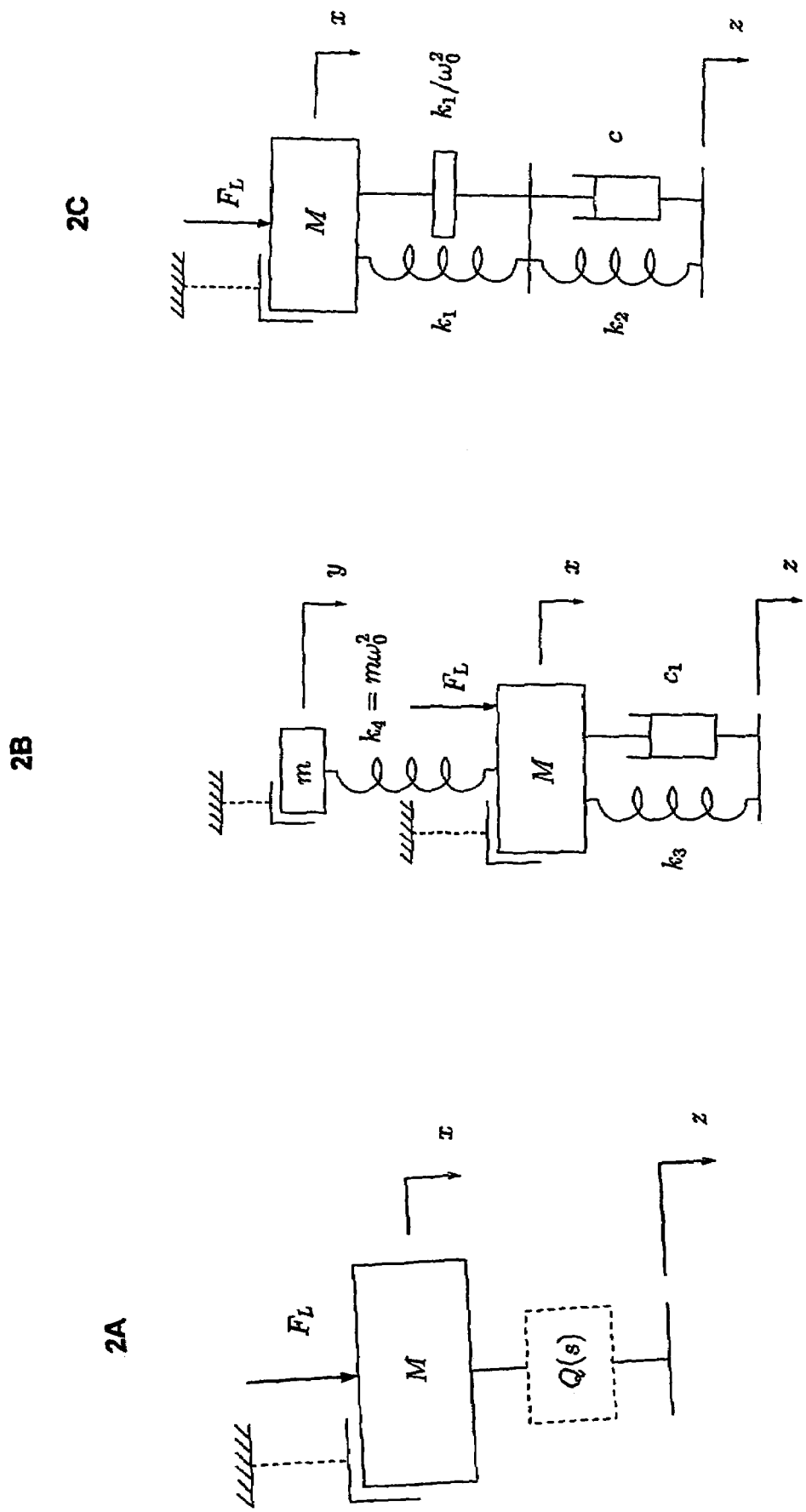
Figure 3:
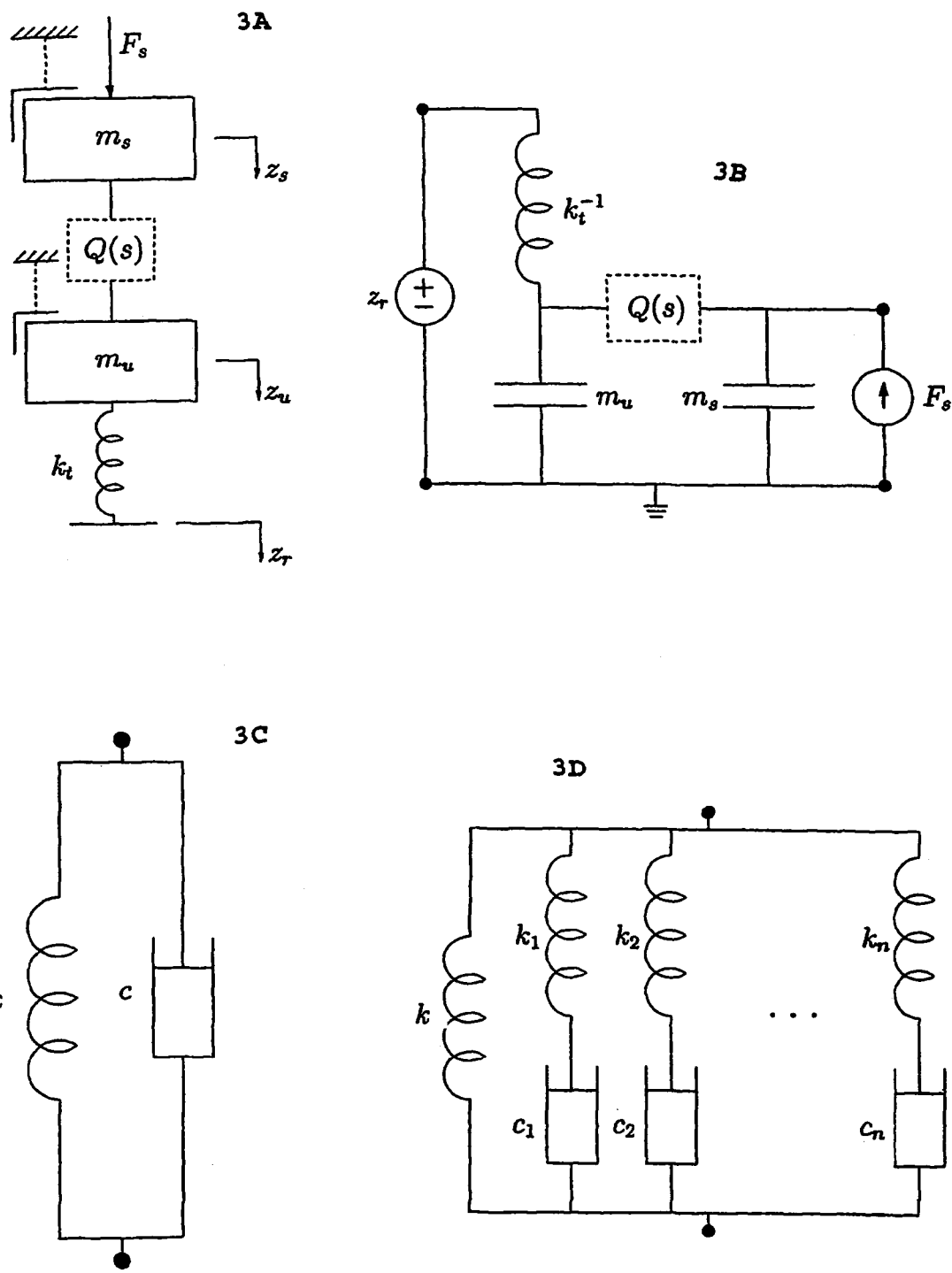
Figure 4B:
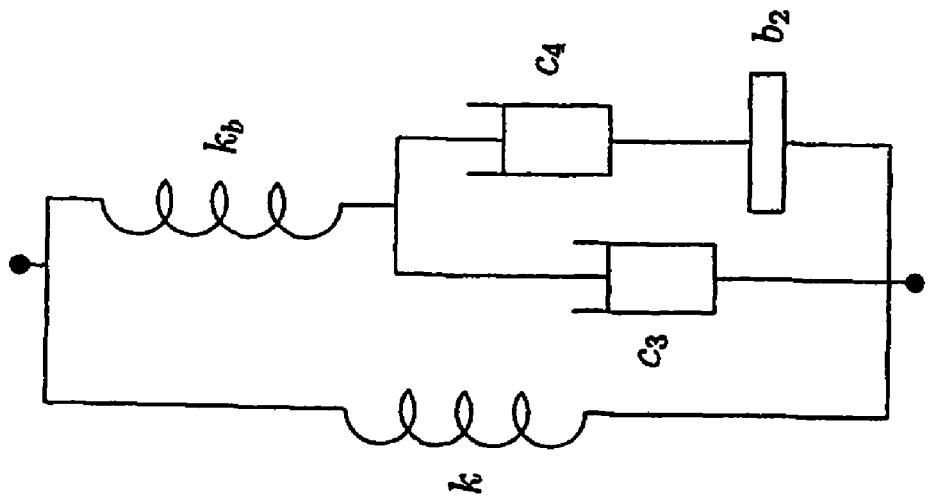
Figure 4A:
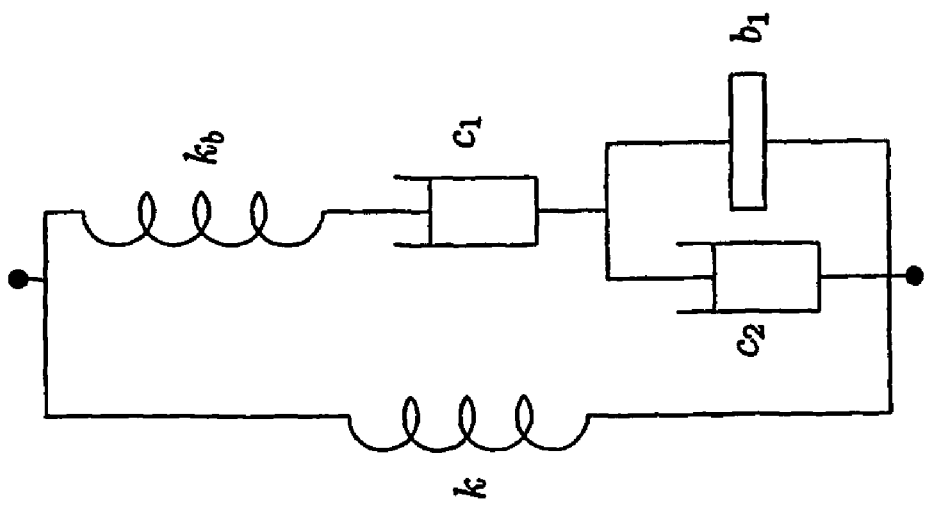
Figure 5A:
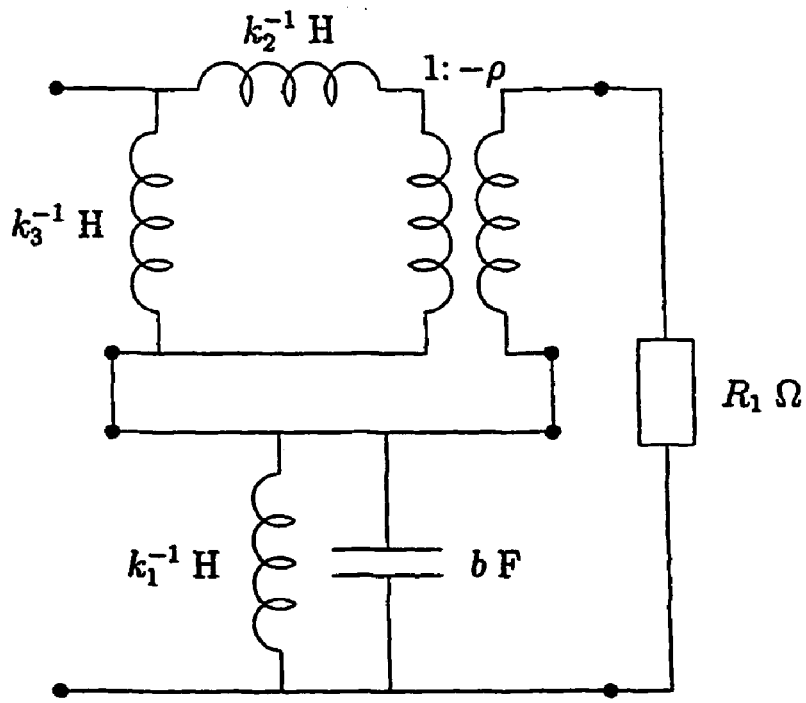
Figure 6:
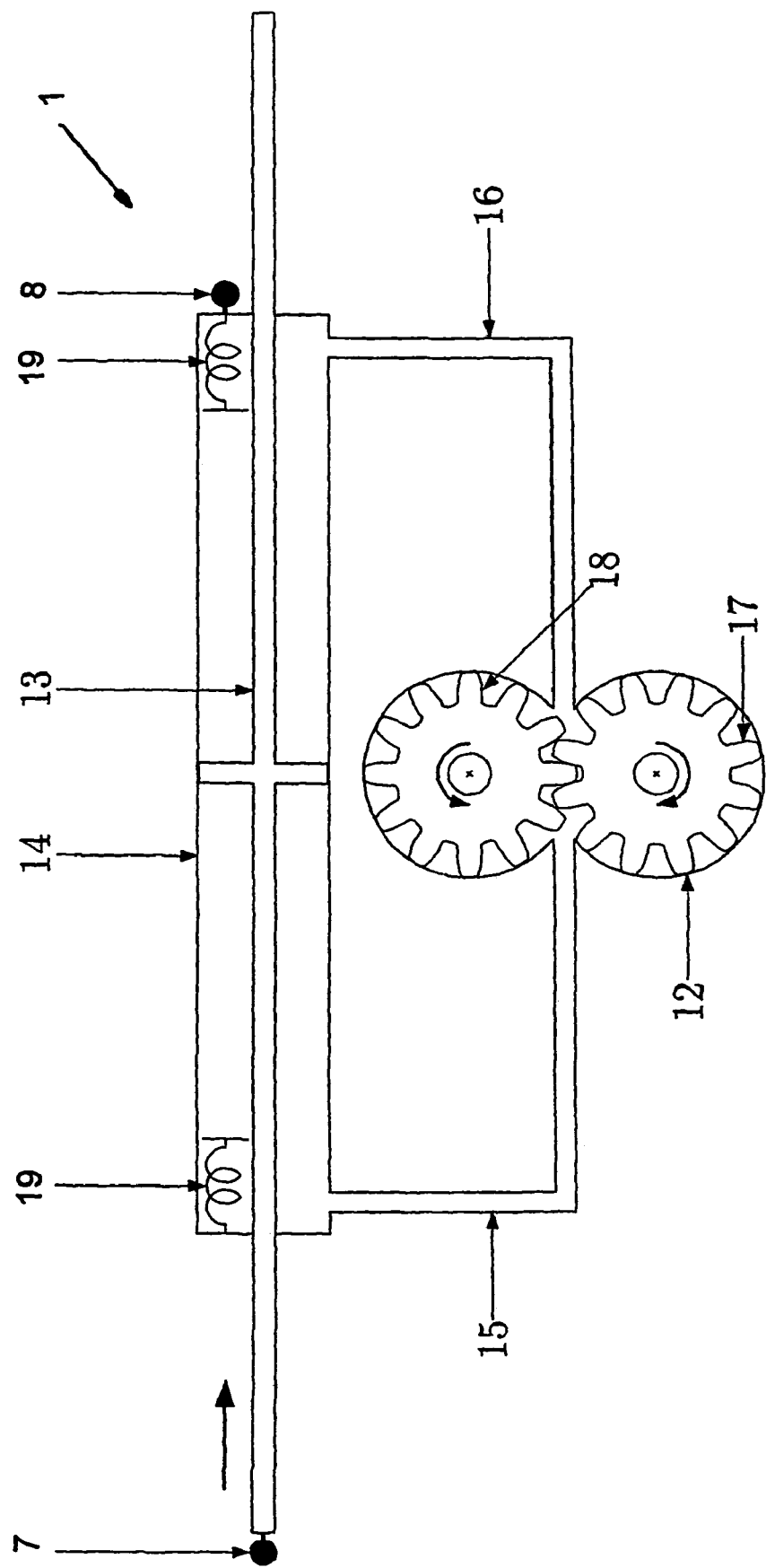
Figure 7A:
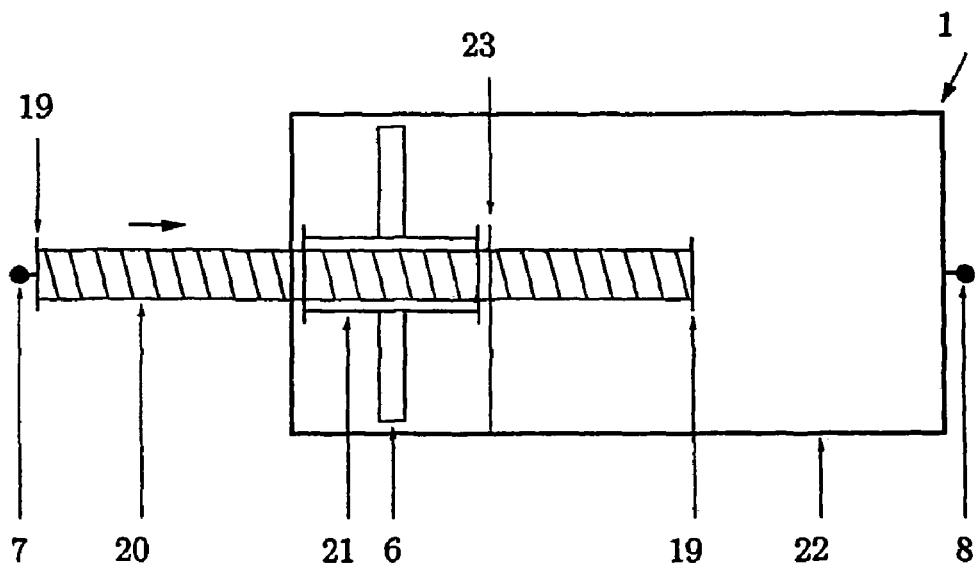
Figure 8:
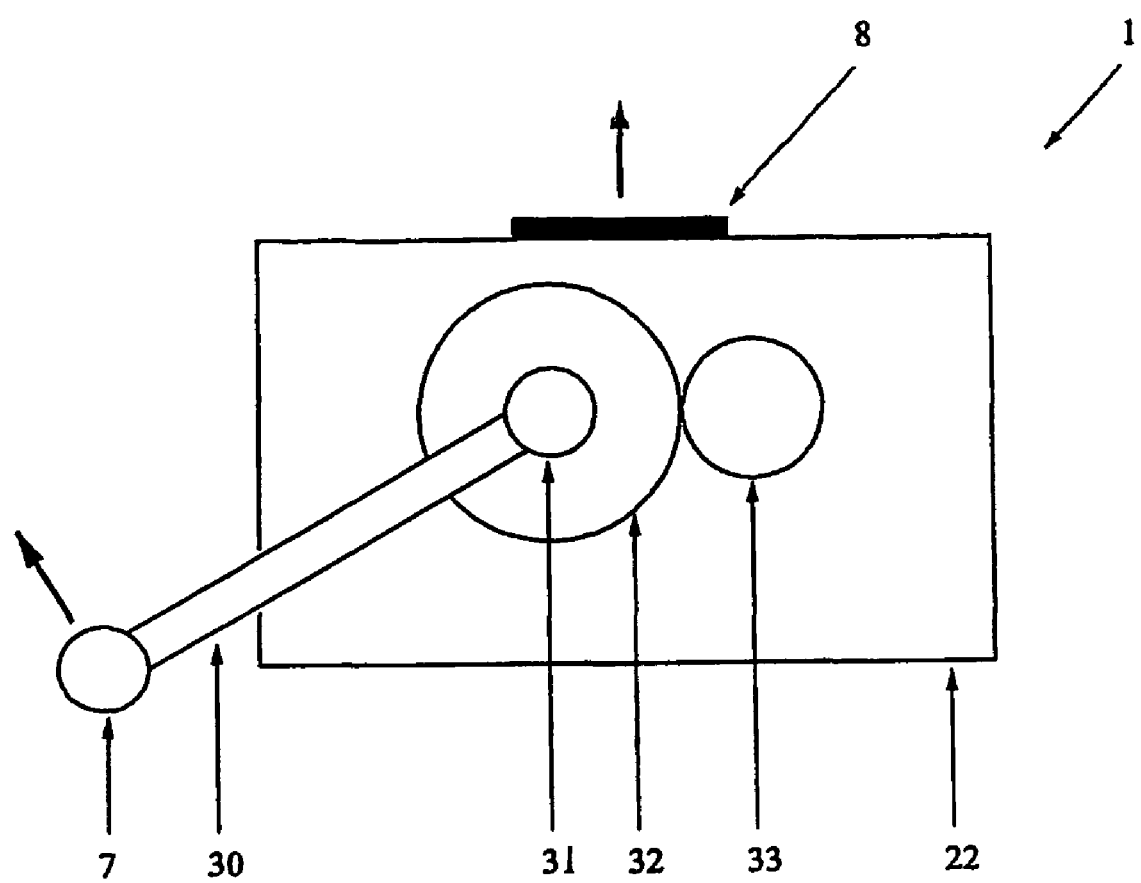
Figure 9:
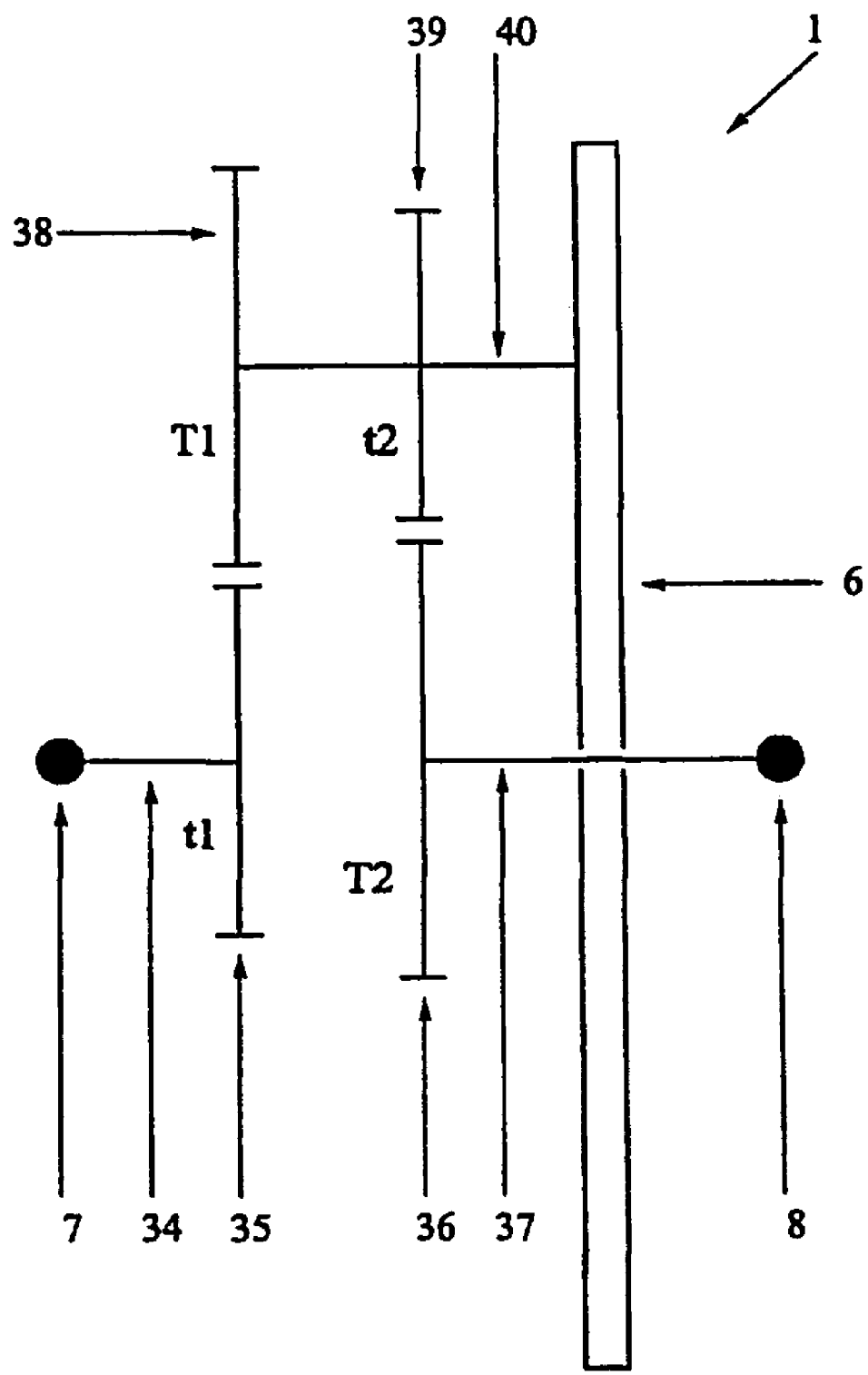
Figures 10A, 10B:
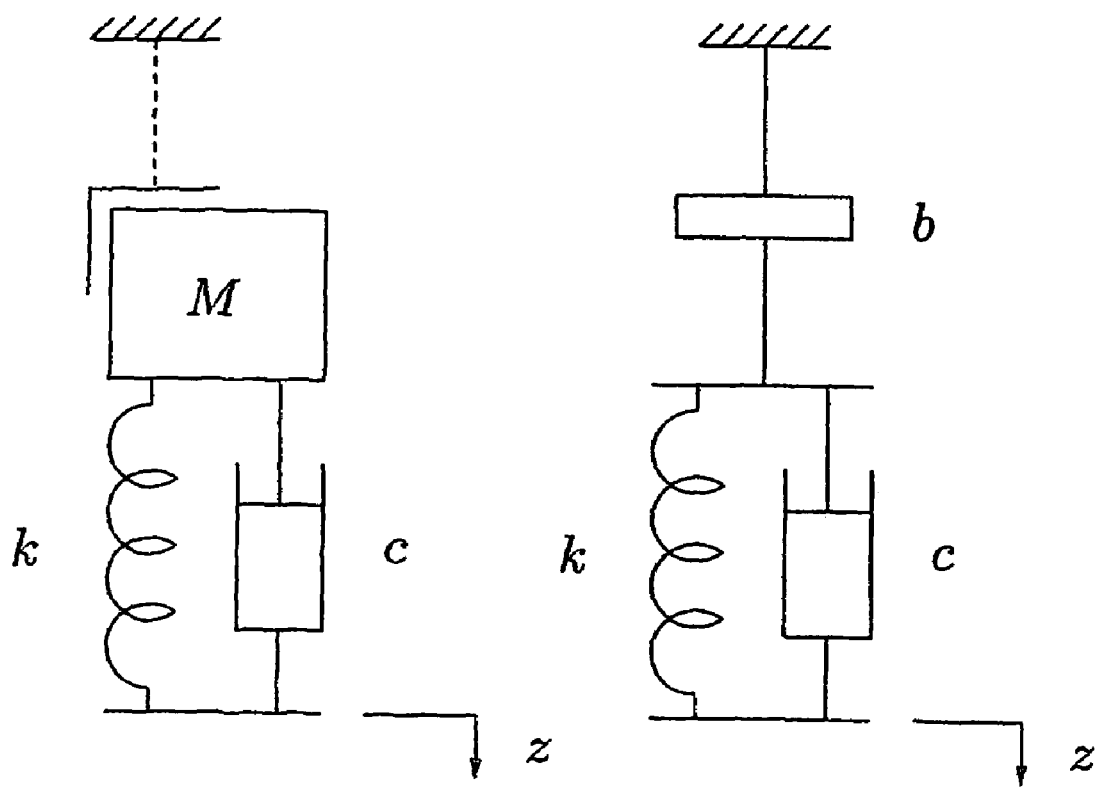

FIGS. 2A to C are symbolic representations of a vibration absorption problem, a conventional solution to the vibration absorption problem and a solution to the vibration absorption problem according to the present invention;

FIGS. 3A to D show symbolic representations of a quarter car vehicle model, an equivalent electrical circuit for the quarter car model, a simple suspension strut and a general solution to this suspension model along conventional lines;

FIGS. 4A and B are symbolic representations of solutions to the suspension problem of FIG. 3A according to the present invention using the method of Brune synthesis;

FIGS. 5A and B are symbolic representations of a further solution to the suspension problem of FIG. 3A according to the present invention using the method of Darlington synthesis;

FIG. 6 illustrates an alternative device according to the present invention employing hydraulic means;

FIGS. 7A and B illustrate another device according to the present invention employing a ball screw arrangement;

FIG. 8 illustrates another device according to the present invention employing a lever arm;

FIG. 9 illustrates another device according to the present invention in rotational form employing epicyclic gears; and FIGS. 10A and B show a spring-mass-damper system and its equivalent incorporating a device according to the present invention.

Figure 1:
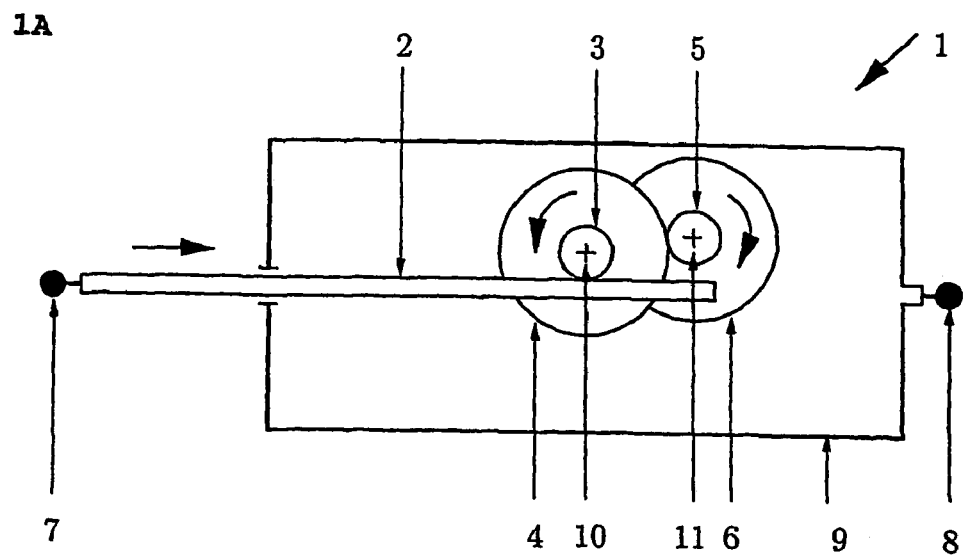
FIG. 1A is a diagrammatic view of the principal components of a device according to the present invention.
FIG. 1B illustrates a free-body diagram of a two terminal, mechanical network to indicate sign conventions.
Figure 1:
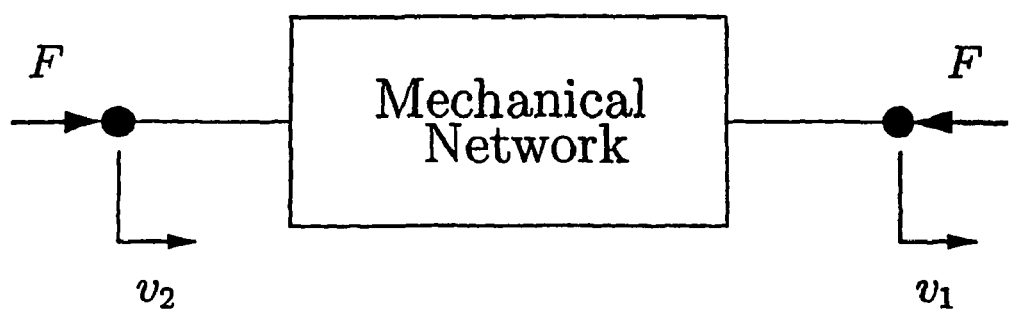

FIG. 1A illustrates a simple example of a device according to the current invention. The device 1 comprises a plunger 2 which is constrained to slide rectilinearly relative to the housing 9. A rack is mounted on the plunger 2 and engages with the pinion 3 which is supported on an axle 10 attached to the housing 9. The pinion 3 is attached to a gear wheel 4 which engages a further pinion 5 which is supported on an axle 11 attached to the housing 9. The pinion 5 is attached to the flywheel 6. The device has two terminals 7 and 8. The terminal 7 is attached to the plunger 2 and the terminal 8 is attached to the housing 9. Neither of these terminals 7, 8 is required to be attached to a fixed point in an inertial frame, but each are, in use, attached to other components in the mechanical system in which the device is used. The two terminals are freely movable in space with respect to each other. The terminals may comprise ball joints, pin joints, rigid joints or other connection means.

The motion of the device 1 may be restricted at the specified limits of travel of the plunger by devices such as spring buffers. Such means may provide a useful safety feature to protect the device if large forces or velocities were generated at the limits of travel of the plunger. Additional safety features may include means to disconnect, or temporarily disconnect, the flywheel or introduce some form of temporary energy dissipation, if certain forces or torques are exceeded. A clutch mechanism or viscous coupling may be employed for this purpose.

In the realisation of FIG. 1A the characteristic parameter of the device, namely the constant of proportionality between applied force at the terminals 7, 8 and relative acceleration between the terminals, can be varied by altering values such as the gearing ratios, the number and type of gearing stages and the mass and radius of gyration of the flywheel 6. The precise effect of such parameters will be detailed below.

We refer first to FIG. 1B which shows a free-body diagram of a two-terminal mechanical network experiencing an equal and opposite force F which is compressive when F is positive. The corresponding relative velocity is denoted by $v=v_2-v_1$ and is positive when the nodes move towards each other, where $v_1$ and $v_2$ are the velocities experienced by the first and second terminals of the network respectively.

Returning to FIG. 1A we let $r_1$ be the radius of the pinion 3, $r_2$ the radius of the gear wheel 4, $r_3$ the radius of the flywheel pinion 5, $\gamma$ the radius of gyration of the flywheel 6, m the mass of the flywheel 6 and we assume for simplicity that the mass of all other components is negligible.

Assuming $v_1=0$, i.e. the right hand (first) terminal of the device is fixed, we can check that the following relation holds:

$$F=(m\alpha_1^2\alpha_2^2)\dot{v}_2 \qquad (1)$$

where $\alpha_1=\gamma/r_3$ and $\alpha_2=r_2/r_1$.

If $v_1 \neq 0$ the direct inertial effect of the flywheel 6 mass will be relevant, but this will only change (1) by a small proportion providing $\alpha_1^2\alpha_2^2$ is large. To a first approximation, such an effect can be neglected, as is commonly done for springs and dampers and we can rewrite the defining equation of the device as:

$$F=b\dot{v}$$

where $b=m\alpha_2^2\alpha_2^2$ has the units of kilograms. Note that even with relatively modest ratios e.g. $\alpha_1=\alpha_2=3$ the proportionality constant, b is a factor of 81 times the flywheel 6 mass. It is clearly feasible to introduce additional gearing; an extra gear wheel and pinion with ratio $\alpha_3$ will multiply b by a factor $\alpha_3^2$. Increasing the gearing ratios also increases internal forces in the device and the flywheel 6 angular velocity, the latter is given by $r_2 r_1^{-1} r_3^{-1}(\dot{v}_2-\dot{v}_1)$ in the above model. Clearly, the mass of the device 1 may be kept small in an absolute sense, and compared to the proportionality term b of the device 1. An example device according to the invention has been made which has a b value of about 300 kg whilst having a mass of about 1 kg.

The device 1 has a finite linear travel which can be specified to a predetermined value and the device 1 can function adequately in any spatial orientation.

Such a device 1 is an embodiment of the present invention with a fixed proportionality constant. The deviation in behaviour from equation (1) may in principle be kept as small as desired for a fixed value of proportionality constant.

Other embodiments of a device 1 which produce an essentially similar effect to that of FIG. 1A are clearly possible. For example, other gearing means may be employed such as toothed belts, or alternative methods may be employed to translate linear into rotary motion. More than one flywheel 6 could be used with counter-rotation to compensate for gyroscopic effects if necessary. Realisations involving hydraulics are also a possibility.

Embodiments of a device 1 according to the present invention may usefully contain additional features, such as means to easily adjust the proportionality constant b or function of the device 1. This may involve a discretely or continuously adjustable gearing stage, or means to adjust the moment of inertia of the flywheel 6. Such adjustability may be extended to allow a dynamic variation in the effective gearing ratio or moment of inertia as a function of the state of the device 1, e.g. the relative velocity between the terminals 7,8, which effectively allows the proportionality term b of the device 1 to be a function rather than a fixed constant. Such a dynamic variation could be achieved within the gearing stage or by allowing features such as spring-loaded fly-balls which are forced outwards with increased angular velocity.

FIG. 2A represents a general vibration absorption problem in which the invention may be employed. The mass M is connected to a structure by a device whose mechanical admittance is Q(s). The mass may be subjected to a force $F_L$ and the displacement of the mass and the structure are x and z respectively. We seek to design and realise a positive real Q(s) so that if $z=\sin(\omega_0 t)$ then $x(t) \to 0$ as $t \to 0$. Namely the mass is impervious in the steady state to a sinusoidal disturbance of the structure of known frequency.

In the conventional solution to this problem, as illustrated in FIG. 2B, the vibration absorber consists of a tuned spring mass system attached to the mass M. This introduced mass m may experience large amplitude oscillations thus, in practice, m and the stiffness of the spring $k_4$ will need to be sufficiently large to avoid excessive oscillations in m. This may be a disadvantage if it is undesirable to mount too much additional mass on M.

Alternatively, a solution may be provided as shown in FIG. 2C where a spring of constant $k_2$ and damper of constant c in parallel are provided in series with a spring of constant $k_1$ and a device according to the invention with proportionality constant $k_1/\omega_0^2$, also in parallel. The circuit symbol used in the figure for the device according to the present invention is a thin rectangle and is perhaps reminiscent of a flywheel 6. The parallel combination of the spring and the device according to the invention behaves like a mechanical oscillator with natural frequency tuned to the disturbing frequency acting on the structure.

The dynamic response properties of the two solutions are broadly similar, as are the asymptotic properties as the additional mass or the constant b of the device becomes large or small. The approach of the invention has an advantage, however, in that there is no need to mount additional mass on M and to be concerned about possible limits of travel of this additional mass.

FIG. 3A represents a quarter car model (i.e. the model of one wheel station in a vehicle). The model consists of the sprung mass $m_s$, the unsprung mass $m_u$ and a spring with vertical stiffness $k_t$ which represents the tyre.

The "suspension strut", in which the invention may be employed, connects the sprung and unsprung masses and is assumed to provide an equal and opposite force on the sprung and unsprung masses with a mechanical admittance of Q(s) and to have negligible mass. The displacements of the sprung mass, unsprung mass and tyre contact patch are $z_s$, $z_u$ and $z_r$ respectively. To approximately model such effects as inertial loads due to braking, accelerating etc. an external force $F_s$ is considered to act on the sprung mass. The other external input represents the undulations of the road and is modelled in mechanical network terms as a velocity source $\dot{z}_r$.

Using the force-current analogy, the quarter-car model of FIG. 3A has an electrical analogue as shown in FIG. 3B, with the two masses becoming grounded capacitors and the two external inputs $F_s$ and $\dot{z}_r$ being current and voltage sources respectively.

There are a number of practical design requirements for a suspension system such as passenger comfort, handling, tyre normal loads, limits on suspension travel etc. which require careful optimisation. In the simplified quarter-car model these can be translated approximately into specifications on the disturbance responses from $F_s$ and $z_r$ to $z_s$ and $z_u$. To insulate the sprung mass from load disturbances $F_s$ requires a "stiffly sprung" suspension, whereas to insulate it from road disturbances $z_r$ requires a "softly sprung" suspension in the traditional sense. Active suspensions allow these transmission paths to be shaped independently but passive suspensions do not. The traditional suspension strut, comprising a spring in parallel with a damper as shown in FIG. 3C, involves some severe compromises. A fully active suspension does not have these restrictions, but there are drawbacks in terms of reliability, expense and complexity. For this reason, there has been interest in exploring the benefits of more sophisticated passive suspensions. Currently, passive (linear) suspension struts make use only of springs and dampers and possibly levers but no significant mass. In electrical terms this corresponds to circuits comprising inductors and resistors (and transformers) only. The driving-point impedance or admittance of such circuits is quite limited compared to those using capacitors as well and this is the case also with the equivalent mechanical networks. In particular the poles and zeros of such admittance functions must lie on the negative real axis and alternate with each other. Moreover, any such admittance function can be realised in the special form shown in FIG. 3D which comprises parallel sets of springs, with stiffness coefficients $k_i$, and dampers, with damping coefficients $c_i$ (where i=1 to n), in series, all set in parallel with a further spring with a stiffness coefficient k.

When a suspension strut with very high static spring stiffness is required, it can be shown that conventional spring and damper arrangements always result in very oscillatory behaviour. This oscillatory behaviour is reduced with the use of the present invention.

FIGS. 4A and B illustrate solutions according to the present invention, obtained using the method of Brune synthesis applied to a standard form of positive real admittance of given order. Brune showed that any real-rational positive real function could be realised as the driving-point impedance of an electrical network consisting of resistors, capacitors, inductors and transformers. Each of the networks according to Brune synthesis are realised by utilising a combination of the device according to the present invention (coefficients $b_1$ or $b_2$), two dampers (damping coefficients $c_1$ and $c_2$ or $c_3$ and $c_4$) and two springs (stiffness coefficients k and $k_b$). It can be shown that the network in FIG. 4B requires lower parameter values than those in FIG. 4A and consequently is more efficient.

Figure 5B:
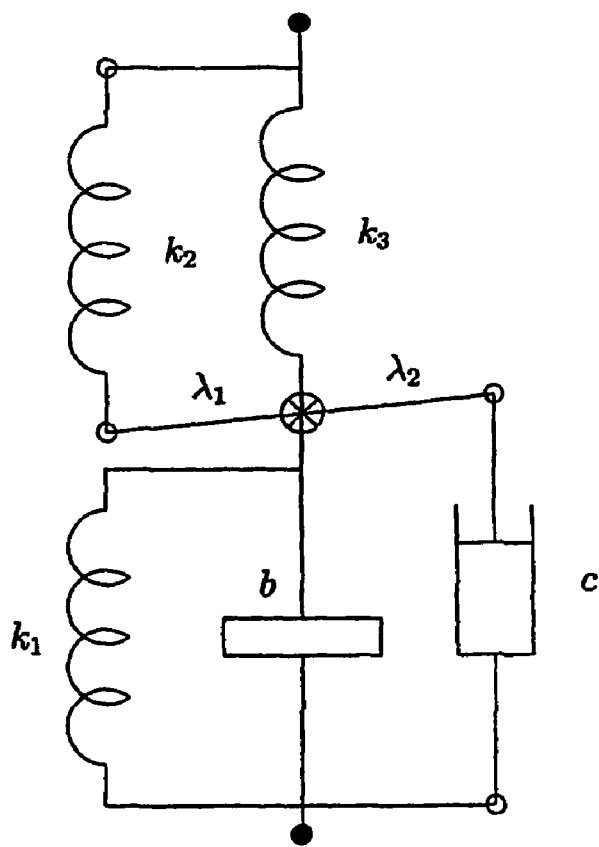

An alternative realisation procedure which may be used is that of Darlington, which realises the impedance as a loss-less two-port network terminated in a single resistance. In mechanical terms this reduces the number of dampers to one. The method of Darlington synthesis applied to a standard form of positive real admittance of given order results in the electrical circuit illustrated in FIG. 5A. The mechanical equivalent network illustrated in FIG. 5B is realised by utilising a combination of the device according to the present invention (coefficient b), a damper (damping coefficient c), three springs (stiffness coefficients $k_1$, $k_2$ and $k_3$) and a lever (arm lengths $\lambda_1$ and $\lambda_2$). The complexity of the network may be regarded to be increased, however, rather than reduced, due to the addition of the lever in place of one of the dampers.

These examples illustrate how electrical network synthesis may be used in combination with the present invention to design mechanical networks.

A further example of the invention is illustrated in FIG. 6, which shows a hydraulic realisation involving a gear pump 12. The device 1 consists of a double acting piston 13 and a cylinder 14 with hydraulic fluid on both sides of the piston. Each end of the cylinder 14 is connected by pipes 15 and 16 to the inlet and outlet of the gear pump 12. Either of the gear wheels 17 or 18 may be connected to a flywheel (not shown), either directly or after further gearing. Alternatively, each of the gear wheels 17 or 18 may be connected to flywheels which then would be counter rotating such that gyroscopic effects may be compensated for, as discussed earlier in the description. The two attachment points (the terminals) of the device are 7 and 8. The device 1 is provided with two spring buffers 19. The device operates by means of the main piston 13 displacing hydraulic fluid from the main cylinder 14 along the connecting pipes 15 and 16 to cause a rotation of the gear pump 12, and vice versa. Under ideal modelling assumptions, the device 1 provides the desired behaviour of a proportionality b between applied force at the terminals 7,8 and the relative acceleration between the terminals 7,8. The proportionality b, under similar ideal assumptions to the device of FIG. 1A, is obtained as follows. Let A be the cross-sectional area of the main cylinder 14 and let V be the volumetric displacement of the gear pump 12 per revolution. Suppose that a flywheel of mass m and radius of gyration $\gamma$ is attached to the gear pump 12. Then it can be shown that the proportionality b of the device is given by $(2\pi A/V)^2 \gamma^2 m$.

Alternatives to the gear pump 12 may be employed such as a crescent pump. Alternatives to the double acting piston 13 may be employed such as a single acting piston together with a free piston and gas chamber, or a single acting piston together with a recuperating chamber. The configuration of FIG. 6, utilising hydraulic components, may incorporate an increased level of natural damping. This may be advantageous where the device of the present invention is deployed in combination with dampers. Further, it may be advantageous to arrange that a device of the type shown in FIG. 6 specifically incorporates features which provide damping, for example orifices or flow control valves which restrict the fluid flow. In this way, an integrated device is obtained consisting of a device according to the present invention and one or more dampers in parallel or in series. In a similar way, springs could be incorporated to obtain integrated devices.

Conversely, devices such as dampers could be modified to incorporate devices according to the present invention, again to provide integrated devices. For example, a device similar to a conventional damper could be configured so that fluid passing through some orifices or valves could give rise to a rotation of a mechanical element which is then connected, via possible further gearing stages, to a flywheel.

Figure 7B:
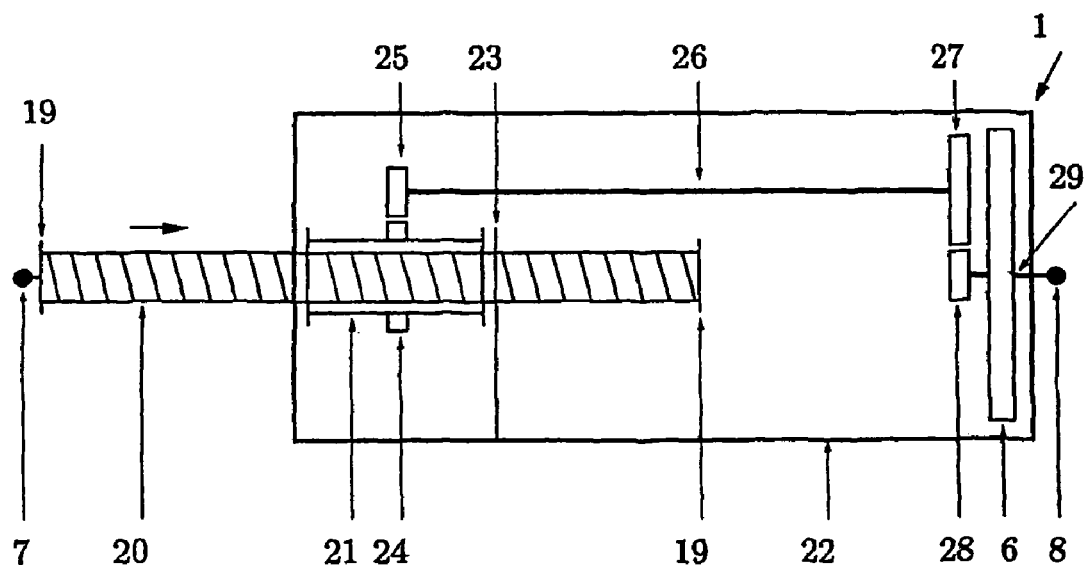

Further examples of the invention are illustrated in FIGS. 7A and 7B which make use of screw mechanisms such as a ball screw 20. In the devices 1 the nut 21 is constrained within the housing 22 by the support 23 so that a linear displacement of the ball screw 20, relative to the housing 22 and along the line joining the terminals 7 and 8, gives rise to a rotation of the nut 21 within the housing 22. In the device 1 of FIG. 7A a flywheel 6 is connected directly to the nut 21. The device 1 operates by means of the motion of the ball screw 20 relative to the housing 22, which is a relative displacement of the terminals 7 and 8, producing a rotation of the flywheel 6. In the device 1 of FIG. 7B there is additional gearing between the nut 21 and the flywheel 6. There are a variety of possible means to achieve this additional gearing, such as the use of epicyclic gears. In this example a gear wheel 24 is connected to the nut 21 which engages with the pinion 25 which is connected by the lay shaft 26 to the gear wheel 27 which engages with the pinion 28. The pinion 28 is attached to the same axle 29 as the flywheel 6. In brief, the device 1 operates by means of the motion of the ball screw 20 relative to the housing 22 producing a rotation of the flywheel 6. The devices 1 of FIGS. 7A and 7B may be provided with spring buffers 19 or other safety features. Under ideal modelling assumptions, the devices 1 provide the desired behaviour of a proportionality b between the applied force at the terminals 7, 8 and the relative acceleration between the terminals 7, 8. The proportionality b, under similar ideal assumptions to the device of FIG. 1A, is obtained as follows. Suppose the screw 20 has a pitch p (m), that the flywheel 6 has a mass m (kg) and radius of gyration $\gamma$ (m). Then it can be shown that the device 1 of FIG. 7A has a proportionality b given by $m\gamma^2(2\pi/p)^2$ (kg). If the two gearing stages in the device 1 of FIG. 7B have ratios $\alpha_1$ and $\alpha_2$ then the device 1 has a proportionality b given by $m\gamma^2(2\pi/p)^2 \alpha_1^2 \alpha_2^2$ (kg).

A further example of the invention is illustrated in FIG. 8. The device 1 employs a lever arm 30 which connects the terminal 7 to the rocker shaft 31 which is constrained to rotate within the housing 22. A gear wheel 32 is also attached to the rocker shaft 31 and engages with the pinion 33, which is constrained to rotate within the housing 22, and which drives a flywheel (not shown) either directly by being mounted on the same shaft as the pinion 33 or by means of further gearing. In effect the rotation of the lever arm 30 relative to the housing 22 causes a flywheel within the housing 22 to rotate. Alternative means of driving the flywheel from the rocker shaft 31 may be employed, such as epicyclic gears. The lever arm 30 typically operates through a small enough angle so that the vertical movement in the plane of the diagram of the terminal 8 connected to the housing 22 and the vertical component of motion of the terminal 7 provide the independent movement of the two terminals. The desired proportionality term b is then obtained between the vertical component of the applied force at the terminals 7, 8 and the vertical components of the relative acceleration between the terminals 7, 8. The proportionality term b, under similar ideal assumptions to the device of FIG. 1A, is obtained as follows. Suppose that the lever arm has length L and in its nominal position is inclined at an angle $\alpha$ to the horizontal. Suppose that a rotation of the rocker shaft 31 through an angle $\theta$ corresponds to a rotation of the flywheel through an angle $\beta\theta$ and that the flywheel has mass m and radius of gyration $\gamma$. Then it can be shown that the proportionality term b of the device is given by $m(\beta\gamma/L \cos\alpha))^2$. The presence of the cos $\alpha$ term in the denominator of the expression for b provides a means to obtain an adjustable value for the proportionality term b as a function of the nominal operating angle $\alpha$.

An approach to providing integrated devices which combine devices according to the current invention with other devices such as springs and dampers can be illustrated in the context of FIG. 8. The rotation of the rocker shaft 31 could be arranged to provide a spring capability by means of a torsion bar. The rotation of the rocker shaft 31 could also be arranged to provide a damping capability similar to the method employed in the standard lever arm dampers, for example, by providing pistons connected to the rocker shaft which force oil through orifices.

The device of FIG. 8 provides an example of the device according to the present invention in rotational form by removing the terminal 7 and the lever arm 30, and by considering the first terminal to be the rotation of the rocker shaft 31 and the second terminal to be the rotation of the housing 22.

The device of FIG. 9 provides an example of the device according to the present invention in rotational form making use of epicyclic gears. The device consists of a compound epicyclic gear train with the planet carrier 40 connected to a flywheel 6. The terminal 7 is connected via the axle 34 to the gear wheel 35 which has $t_1$ teeth. This engages with the first of the planet compound gear wheels 38 which has $T_1$ teeth. On the same axle 40 is the gear wheel 39 which has $t_2$ teeth. This engages with the gear wheel 36 which is mounted on the axle 37. The gear wheel 36 has $T_2$ teeth and is attached to the terminal 8. Let $\omega_A$, $\omega_B$ and $\omega_C$ be the angular velocities of the shaft 34 (terminal 7), the planet carrier 40, and the shaft 37 (terminal 8) respectively. Then it can be shown that, if $\omega_C=0$, then $\omega_B=R_0\omega_A$ where $R_0=T_1T_2/(t_1t_2)$ is the basic ratio. In general it can be shown that $$\omega_c = \frac{\omega_b - \omega_A}{R_0 - 1} + \omega_B \quad (2)$$

If $R_0$ is close to one, the second term on the right-hand side of (2) may be neglected and there is an approximate proportionality between the differential angular velocities of the terminals 7, 8 and the angular velocity of the planet carrier 40 with proportionality constant $1/(R_0-1)$. Under similar ideal modelling assumptions to the device of FIG. 1A it can be seen that the proportionality between the torques at the terminals 7, 8 and the relative angular acceleration between the terminals 7, 8 is given by $1/(R_0-1)^2$ multiplied by the moment of inertia of the flywheel 6. The neglect of the second term in (2) is similar to the case in the analysis of FIG. 1A when the velocity of the right-hand terminal is set to zero or neglected.

A variety of different epicyclic gear arrangements may be employed to obtain an essentially similar behaviour to that shown in FIG. 9.

The device of FIG. 9 may be used as a component in a device similar to that shown in FIG. 8. Namely, a lever arm 30 may be attached to the terminal 7 in FIG. 9 so that a new terminal 7 is obtained as in FIG. 8, and a housing 22 attached to the terminal 8 in FIG. 9 to obtain a new terminal 8 as in FIG. 8.

The device of FIG. 9 may also be used as a component in the devices of FIGS. 1A, 6, 7A and 7B to achieve a further speed up of the rotary motion within the devices, in order to achieve a larger proportionality constant.

The device of FIG. 9 may be used in the control of torsional vibrations. In the case where rotating elements, such as those found in rotating machinery, need to be connected to terminal 7 and the other rotating element connected to terminal 8. For the control of torsional vibrations it may be advantageous to additionally connect rotational springs and/or rotational dampers between the rotating elements. For the device of FIG. 9 this may be achieved by directly connecting the rotational spring and/or rotational damper directly between the gear wheel 35 and the gear wheel 36.

FIG. 10A illustrates a typical spring-mass-damper system and FIG. 10B illustrates an equivalent system according to the present invention. In the examples detailed above neither of the terminals 7, 8 is attached to a fixed point in an inertial frame. By fixing one of these terminals (as illustrated in FIG. 10B), a mass simulator may be achieved. Such a device may be used for testing a spring-damper support or absorber before final installation, especially where it may be impractical to test it on a real mass element as depicted in FIG. 10A. This impractical situation may arise where the required mass, M, is particularly large.

The invention claimed is:

1. A mechanical device for use in the control of mechanical forces, the device comprising:
    first and second terminals that are connectable to components in a system to control mechanical forces applied to the components, wherein the first and second terminals are independently moveable with respect to each other; and
    means connected between the terminals for controlling the mechanical forces at the terminals such that the mechanical forces are proportional to the relative acceleration between the terminals in accordance with a predetermined proportionality term, wherein the means for controlling the mechanical forces at the terminals comprises a mechanical linkage between the terminals, and the predetermined proportionality term includes a fixed constant or a variable function.

2. A mechanical device according to claim 1, wherein the variable function is a function of the relative velocity between the terminals.

3. A mechanical device according to claim 1, wherein the device is configured such that the mass of the device is independent of the value of the proportionality term.

4. A mechanical device according to claim 1, wherein the device further comprises:
    means for restricting the extent of relative movement of the first and second terminals.

5. A mechanical device according to claim 1, wherein the extent of relative movement of the two terminals is established independently of the predetermined proportionality term.

6. A mechanical device according to claim 1, wherein the device is configured such that no part of the device is connected to a fixed point.

7. A mechanical device according to claim 1, wherein the device is configured to provide the predetermined proportionality term regardless of the orientation of the device.

8. A mechanical device according to claim 1, wherein the means for controlling the mechanical forces at the terminals comprises:
    a plunger attached to one of the first and second terminals;
    a housing attached to the other of the first and second terminals and slidably attached to the plunger; and
    a flywheel within the housing arranged to be driven when the plunger moves with respect to the housing.

9. A mechanical device according to claim 8, wherein a driving mechanism for the flywheel comprises a means for converting the linear motion of the plunger, sliding relative to the housing, into a rotary motion within the device.

10. A mechanical device according to claim 9, wherein the driving mechanism is provided by a rack and pinion configuration, which drives the flywheel through a gearing system.

11. A mechanical device according to claim 9, wherein the driving mechanism is provided by a screw mechanism.

12. A mechanical device according to claim 9, wherein the means for controlling the mechanical forces at the terminals further comprises:

hydraulic components; and means for converting a linear flow of hydraulic fluid into rotary motion which either directly drives the flywheel or is connected thereto by further gearing.

13. A mechanical device according to claim 8, wherein the plunger comprises a screw.

14. A mechanical damping system employing a mechanical device according to claim 1.

15. A method for vibration absorption, employing a mechanical device according to claim 1.

16. A mass simulator comprising a device according to claim 1.

17. A mechanical device according to claim 1, wherein the means for controlling the mechanical forces at the terminals comprises:

a screw attached to one of the first and second terminals;
a housing attached to the other of the first and second terminals and slidably attached to the screw; and
a flywheel within the housing arranged to be driven when the screw moves with respect to the housing.

18. A mechanical device according to claim 17, wherein a driving mechanism for the flywheel comprises a means for converting the linear motion of the screw, sliding relative to the housing, into a rotary motion within the device.

19. A mechanical device for use in system for controlling mechanical torques, the device comprising:

first and second terminals that are connectable to components in the system, wherein the first and second terminals are independently rotatable with respect to each other; and means connected between the terminals for controlling the mechanical torque applied to the terminals such that the torque is proportional to the relative angular acceleration between the terminals in accordance with a predetermined proportionality term, wherein the means for controlling the mechanical torque applied to the terminals comprises a mechanical linkage between the terminals, and the predetermined proportionality term includes a fixed constant or a variable function.

20. A mechanical device according to claim 12, wherein the hydraulic components comprise a piston and cylinder.

21. A mechanical device according to claim 12, wherein the means for converting a linear flow of hydraulic fluid into rotary motion comprises a gear pump that either directly drives the flywheel or is connected thereto by further gearing.

22. A mechanical damping system according to claim 14, wherein the mechanical damping system is a system within a motor vehicle suspension.

23. A mechanical damping system employing a mechanical device according to claim 19.

24. A method for vibration absorption, employing a mechanical device according to claim 19.

* * * * *